United States Patent [19]
Hamm

[11] 3,807,558
[45] Apr. 30, 1974

[54] APPARATUS FOR SEPARATING LIGHTWEIGHT DEBRIS FROM SAND AND GRAVEL

[76] Inventor: Alton B. Hamm, 3724 Scranton Dr., Fort Worth, Tex. 76118

[22] Filed: Oct. 20, 1971

[21] Appl. No.: 190,929

[52] U.S. Cl.................. 209/464, 209/497, 209/500
[51] Int. Cl............................................. B03d 3/00
[58] Field of Search .......... 209/155, 463, 464, 497, 209/498, 500, 450, 461, 156–159, 18, 490, 494

[56] References Cited
UNITED STATES PATENTS

| | | | |
|---|---|---|---|
| 2,933,187 | 4/1960 | Old et al. | 209/464 |
| 1,151,137 | 8/1915 | Vandercook | 209/463 |
| 1,695,021 | 12/1928 | Puryear | 209/18 |
| 1,609,652 | 12/1926 | McQueen | 209/464 X |
| 2,324,549 | 7/1943 | Wigton | 209/464 |
| 2,336,991 | 12/1943 | Leueke | 209/464 |
| 2,025,841 | 12/1935 | Young | 209/156 |
| 2,468,005 | 4/1949 | Walker et al. | 209/464 X |

*Primary Examiner*—Frank W. Lutter
*Assistant Examiner*—Ralph J. Hill
*Attorney, Agent, or Firm*—Wofford, Felsman & Fails

[57] ABSTRACT

The specification discloses a sand screw and a log washer in a gravel washing plant and having arrangements for flowing water at a relatively high velocity in a restricted flow path to one side of the rotating auger and rotating logs of the sand screw and log washer respectively. In addition means is provided for discharging the granular or aggregate material into the flow path of relatively high velocity water for removing unwanted lightweight debris prior to movement of the granular or aggregate material into the zone of operation of the auger or rotating logs of the sand screw and log washer respectively.

1 Claim, 6 Drawing Figures

PATENTED APR 30 1974          3,807,558

INVENTOR
Alton B. Hamm
BY
Wofford, Felsman & Faits
ATTORNEYS

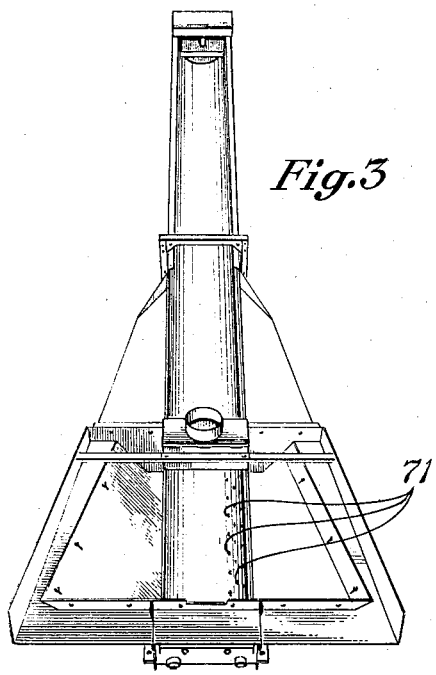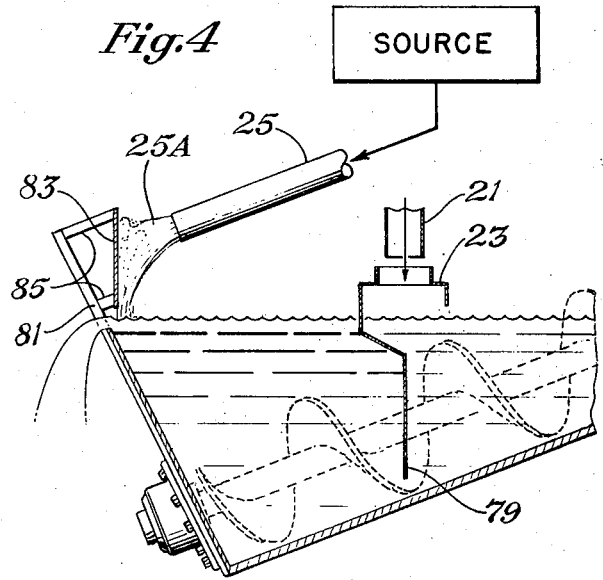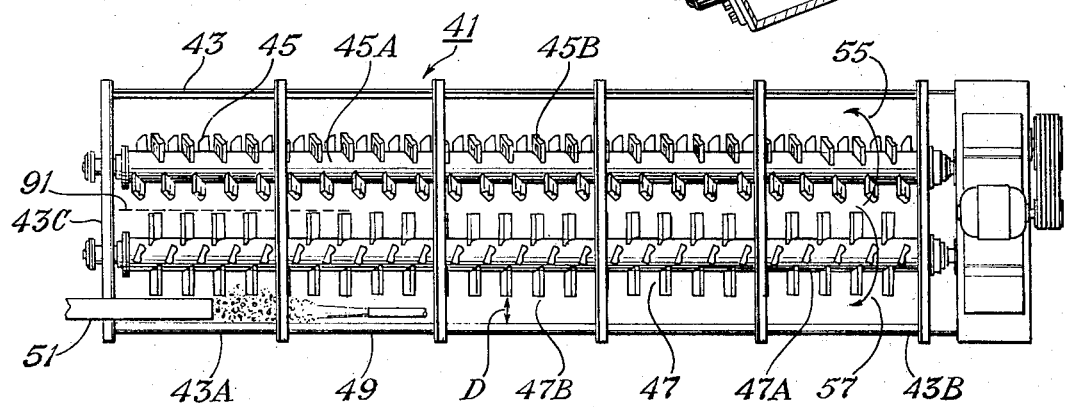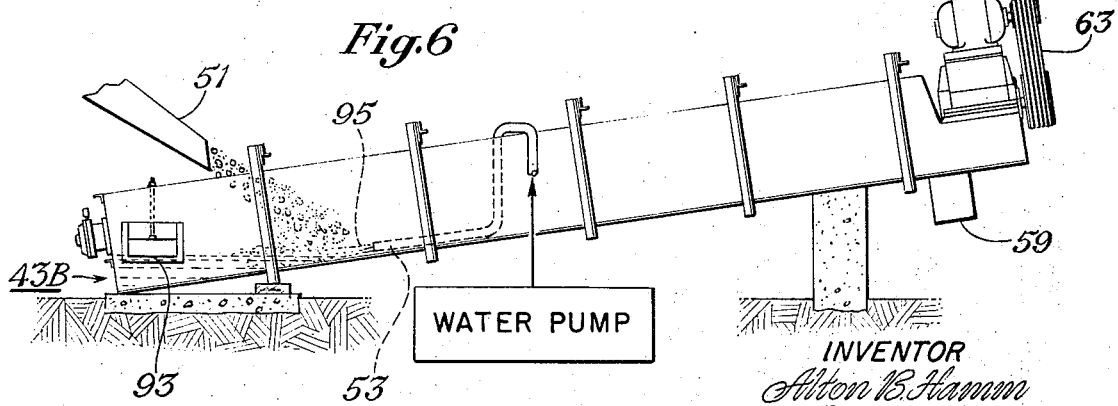

APPARATUS FOR SEPARATING LIGHTWEIGHT DEBRIS FROM SAND AND GRAVEL

BACKGROUND OF THE INVENTION

This invention relates to systems for more effectively removing lightweight debris such as roots and sticks from granular or aggregate material such as gravel to be processed.

In the processing of sand and gravel used for concrete, brick, roofing material, etc., strip mining operations conventionally are carried out to remove the sand and gravel from the ground. In these operations, the top soil containing unwanted debris such as sticks and roots is stripped away before the sought after sand and gravel is removed. The mined material then is sent to a gravel washing plant for separating the material into different grades and for removing the remaining unwanted debris.

These plants generally employ grading screens to separate the material into different grades or sizes. From the grading screens, the finer material is fed to a sand screw while the coarser material is sent to a log washer.

In the conventional sand screw, all of the material fed thereto is discharged directly above the auger at a position in the center of its enlarged tank which employs a slowly rising current of water to float the unwanted lightweight debris out of the tank. The auger then moves the sought after material out of the tank to a discharge port.

In the conventional log washer, the material fed thereto is discharged directly between the two rotating logs located in its tub or container. A water inlet comprising a perforated pipe located between the two logs is employed to inject water into the log washer to float the unwanted debris out of the tub. The rotating logs then grind and separate the finer grained material such as clay from the sought after rocks or gravel which is moved by the rotating logs to a discharge point at the other end of the tub.

These systems are effective in separating the lightweight debris from the sand and gravel obtained from the usual selective mining operations for example where the top soil containing the sticks and roots, etc. is stripped off prior to mining and where a minimum amount of debris is present in the material sent to the gravel washing plant.

The strip mining operations employed in the past to select and remove only the best grade of material have resulted in large amounts of desirable sand and gravel still remaining in the pits. Attempts have been made to reclaim these old pits, however, heretofore they have been unsuccessful from an economic standpoint. Due to the methods employed originally in the strip mining operations the sand and gravel remaining in these old pits are mixed with other soils and debris. Hence selective mining operations cannot be carried out to remove only the sought after sand and gravel. From a practical standpoint, if these old pits are to be reclaimed, all of the material must be removed. This material however is ladened with sticks and roots and other debris and it has been found that the conventional arrangements and systems employed in gravel washing plants will not effectively remove the large amount of unwanted debris found in the material taken from the old pits.

SUMMARY OF THE INVENTION

In a gravel washing plant having a work performing device including an inclined container for receiving granular or aggregate material and rotating means located in a given zone of operation in said container for at least moving the material from a lower point to a discharge point above water level, there is provided in combination therewith an arrangement for effectively removing unwanted lightweight debris from the material. The combination comprises means for flowing water at a relatively high velocity in a restricted flow path in the container to one side of the rotating means and to one side of its zone of operation and means for discharging the material into the flow path of relatively high velocity water for removing unwanted lightweight debris from the material prior to movement of the material into the zone of operation of the rotating means.

In one embodiment the work performing device comprises a sand screw having a rotating auger for separating the material from water. The auger has one end located in an enlarged portion of the container and the other end inclined upward toward a discharge point. Inlet means is provided at the bottom portion of said enlarged portion of said container for injecting water therein. In addition a relatively narrow outlet is provided at the top edge of the enlarged portion of the container to one side of the auger for restricting the flow of water from the enlarged portion of the container and for flowing water from the enlarged portion of the container at a relatively high velocity through the narrow outlet. The discharge means discharges the material near the outlet and onto a dispersing means for spreading the material and debris mixed therein prior to discharge into the flow path of water.

In another embodiment, the work performing device comprises a log washer comprising two elongated and parallel rotating members each having a first end located to be immersed in water and a second end inclining upward toward a discharge point. A conduit is located to one side of the rotating logs and within the container for injecting a stream of high velocity water within the container at the first end thereof. The material is discharged into the stream of high velocity water to one side of the rotating logs.

In both devices the material is discharged into a stream or restricted flow path of water to one side of the rotating auger or rotating logs of the sand screw and the log washer to remove the lightweight debris prior to movement of the material into the zone of operation of the auger or logs. This arrangement has been found to do a very effective job in removing the unwanted lightweight debris and has for the first time made the reclaiming of old pits practical from an economic standpoint.

BRIEF DESCRIPTION OF THE DRAWINGS

FIG. 3 is a top view of the sand screw of FIG. 2 with the auger and other components removed;
FIG. 4 is a side view of a portion of the sand screw;
FIG. 5 is a top view of a log washer;
and
FIG. 6 is a side view of the log washer of FIG. 5 with its two logs removed.

DETAIL DESCRIPTION OF THE PREFERRED EMBODIMENTS

Figure 1:
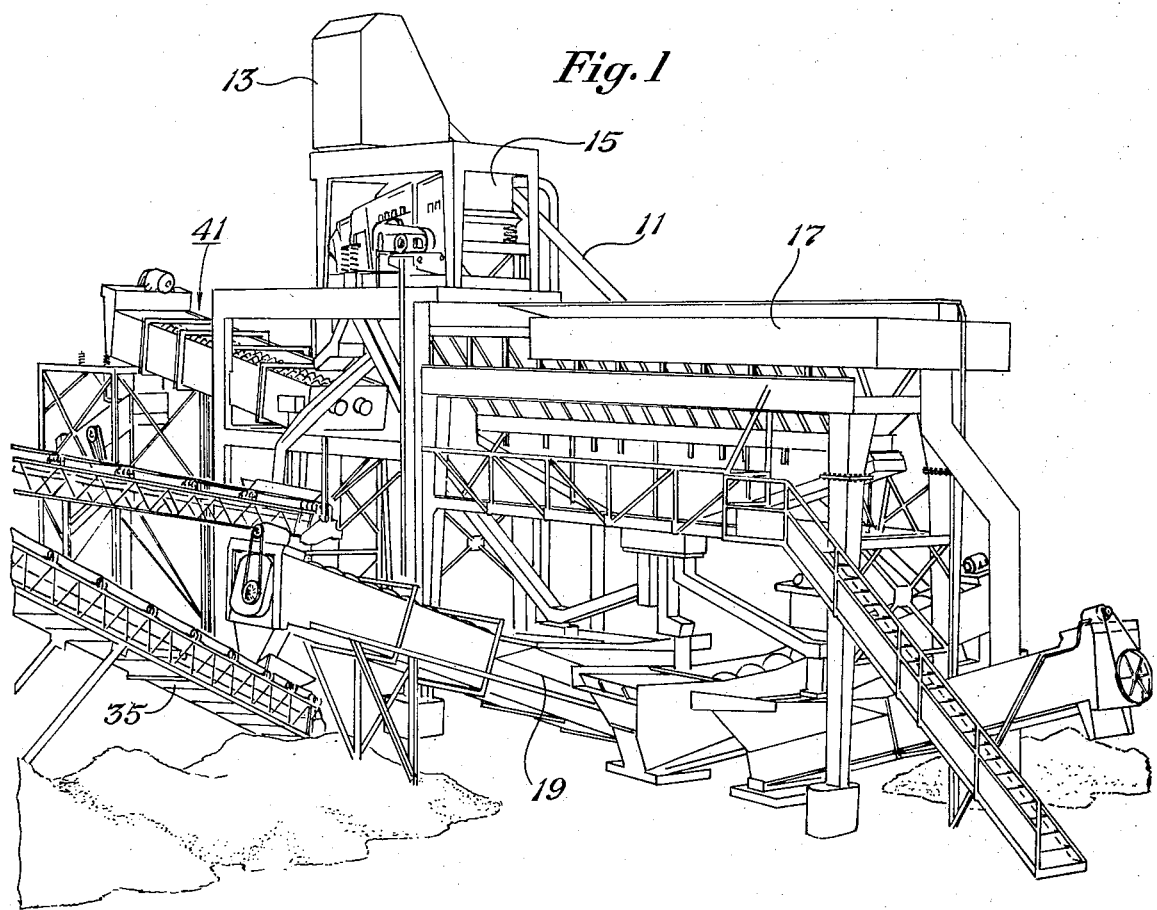
FIG. 1 illustrates a gravel washing plant.

Referring now to FIG. 1, a brief description of the gravel washing plant will be given. In the reclaiming operations, the old abandoned pits are filled with water and a dredge is used to dredge the material from the pits. The material obtained from the dredge then is fed to the gravel washing plant by way of a pipeline illustrated at 11. From the pipeline, the material is fed to a receiving box 13 and then to a shaker screen 15. The screen 15 separates the material depending upon its coarseness and size. The finer material up to one-eighth inch in diameter and separated by the screen 15 is fed to a settling tank 17 which generally is employed to grade the material. The grass and finer debris in the fine grained material in the tank 17 float to the top and are adequately removed. A certain amount of fine grain sand from the settling tank 17 then is fed to a sand screw 19. Application of this material to the sand screw 19 is by way of a conduit illustrated at 21 in FIG. 2 and a receiving box 23. This material is illustrated at 21A. Coarser grained gravel having a diameter from one-eighth of an inch to one-fourth of an inch, also known as torpedo sand, is also fed from the screen 15 to the sand screw 19 by way of a conduit 25. This material is illustrated at 25A. It is fed to the back end of an enlarged tank 27 which forms part of the sand screw. Water is injected into the tank 27 by way of an inlet 29 for separating the sticks and roots and other lightweight debris from the torpedo sand injected by way of conduit 25. The finer grained material 21A and the torpedo material 25A are mixed in the sand screw and then moved or conveyed out of the water by way of an auger 31 having its back end located in the enlarged tank portion 27 and its other end 31A extending upward at an inclined angle in an elongated container or tub 33. From the upper end 33A of the container 33, the material is discharged to a conveyor 35 (FIG. 1) which conveys the material to a storage location. The output from the sand screw 19 is known as concrete sand. A suitable power drive 37 is employed for rotating the auger which is supported by bearings illustrated at 49.

The coarser rocks and gravel from the shaker screen 15, for example having a diameter from about one-fourth of an inch to 2 inches is fed to a log washer illustrated at 41 in FIG. 1. Referring to FIG. 5, the log washer comprises an elongated container 43 having two rotating logs 45 and 47 located therein. The log washer is inclined from the horizontal as illustrated in FIG. 6. The aggregate and gravel is fed into the log washer at the lower end by way of a chute illustrated at 51. Water is injected into the lower end of the log washer by way of a conduit 53 to remove the roots and sticks and other lightweight debris from the gravel and aggregate fed into the log washer. The logs 45 and 47 are rotated in the direction of the arrows 55 and 57 to maintain the material in the center of the container and to cause it to grind against itself and against the blades of the logs and in addition to move the material from the lower end 43A to the upper end 43B to an outlet port illustrated at 59. A power means 61 and drive 63 are provided for rotating the logs.

In both the sand screw 19 and the log washer 41, the feed conduit 25 and the chute 51 are located to one side of the zone of operation of the rotating auger 31 and the rotating logs 45, 47 respectively to discharge the materials into restricted flow paths of relatively high velocity water to one side of the operating zone of the rotating devices to affectively remove the unwanted sticks and roots and other lightweight debris in the material. Removal of this debris is important if the finished and processed sand and gravel is to be used for its intended construction purposes. As indicated previously, effective removal of this debris from material obtained from reclaimed pits and employing the conventional systems in the log washing plant heretofore has not been possible.

Figure 2:
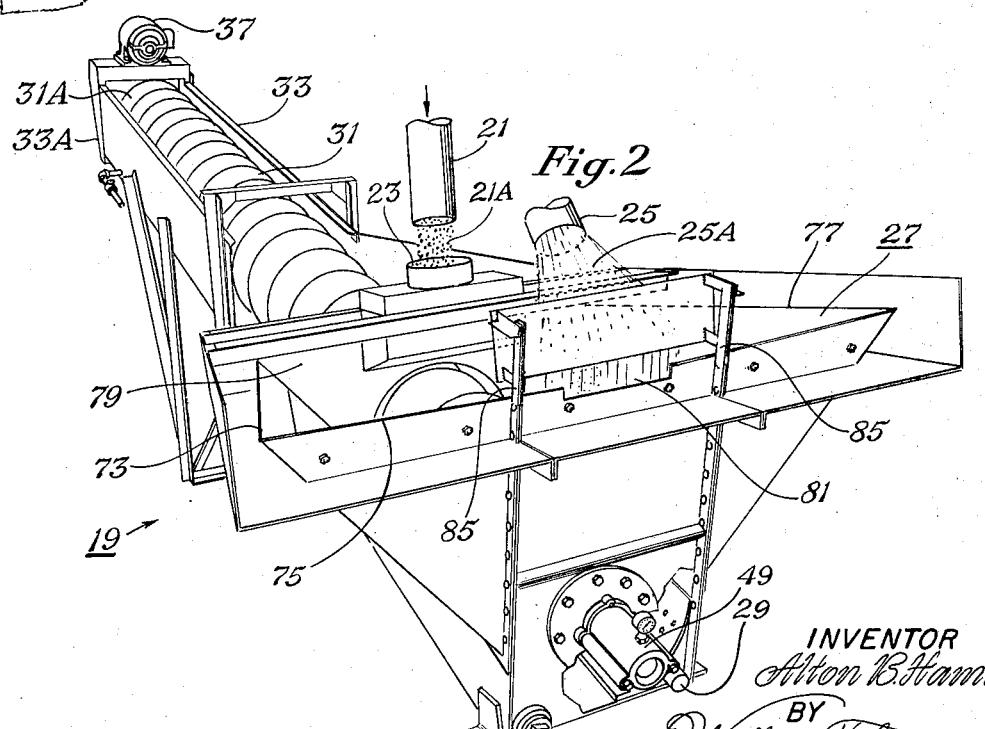
FIG. 2 is a perspective view of a sand screw.

Referring to FIGS. 2, 3 and 4, the sand screw 19 will be described first as well as the new arrangement and combination for effectively removing the unwanted lightweight debris from the torpedo sand. The water inlet 29 leads to a plurality of small discharge ports 71 at the bottom of the tank 27. Surrounding the top edge of the tank 27 are three weirs or baffles 73, 75, and 77 which, prior to the present invention, each had a straight level upper edge over which the water from the ports 71 flowed evenly and hence over a wide path or area out of the tank 27. Heretofore, the finer grained material up to one-eighth of an inch in diameter and the torpedo sand were both injected by way of the conduit 21 into the feed box 23. This feed box is located about 4½ feet from the back weir or baffle 75 and directly over the auger 31. As illustrated in the Figures, a baffle 79 extends downward from the feed box whereby the material injected through conduit 21 into the feed box 23 drops or falls to the right of the baffle 79 as seen from FIG. 4. The purpose of this arrangement is to allow the finer grained sand to fall to the bottom and to prevent it from being washed out and over the weirs by the water injected through the ports 71. The purpose of the water injection through port 71 is to float out the sticks and roots and other lightweight debris found in the material. This arrangement works satisfactory in removing the debris from the material taken from new areas where selective mining operations are carried out and wherein the material taken has a minimum amount of debris mixed therein. As indicated previously, however in mining reclaimed pits all of the material must be taken and hence it is laden with sticks and roots and other debris. Attempts were made to inject both the finer grained material and torpedo sand obtained from reclaimed pits, directly into the feed box 23 by way of conduit 21. It was found however, that the roots and sticks and other lightweight debris from this mixture of material injected through conduit 21 into the feed box 23 would be caught in the action of the auger 31 and the auger would mix the roots and sticks with the sand and gravel. Thus the roots and sticks would not have a chance to separate from the sand and gravel and a large amount of roots, sticks and debris was present in the output sand and gravel discharged from the sand screw. In fact the sand and gravel output from the sand screw was completely unusable for commercial purposes.

This problem was solved by forming a small flow path 81 in the top edge of the weir 75 to allow the water from the ports 71 to flow from the tank 27 only through this small and restricted flow path. Thus a rapidly rising current of water is provided which flows at a relatively high velocity only through the restricted flow path 81 which is located at the back end of the tank and to one side and away from the zone of operation of the auger 31. In addition the conduit 25 was provided for discharging material into the back end of the tank 27 at the point of discharge of the water through the flow path 81 and over the weir 75. Located in front of the conduit 25 is a dispersing or spreading plate 83. The material 25A discharged from the conduit 25 is discharged onto the plate 83 which then spreads the material out and allows it to drop near the edge of discharge of the water through the passageway 81 and out of the tank 27. The roots and sticks and other lightweight debris mixed with the torpedo sand are discharged with the torpedo sand into the relatively high velocity water flowing through the restricted path 81, but because of the lighter specific gravity of the roots and sticks, they are forced by the water over the weir 75 through the flow path 81 and out of the enlarged tank portion 27. The heavier small grained gravel and rocks drop to the bottom of the tank and are caught up in the action of the auger 31 and then conveyed to the discharge end 31A.

Thus in the sand screw, the sticks and roots and other lightweight debris are separated from the sand and gravel in a zone outside of the zone of operation of the auger 31 whereby the clean sand and gravel then may fall or settle into the action of the rotating auger.

In the embodiment disclosed, the output of the sand screw is employed for concrete sand as indicated previously. Thus the finer grained sand having a diameter up to one-eighth of an inch is also mixed with the torpedo sand. This is done by feeding the finer grained sand 21A through the conduit 21 and through the feed box 23 as indicated previously. As also indicated previously, the settling tank 17 does an adequate job of separating the grass and small debri from the fine grained sand hence separation of the debris from this sand presents no problem. This sand however is fed through the feed box 23 into the middle of the tank 27 in order to prevent the flow of water from carrying it over the weir 75.

In one embodiment, the tank portion 27 is about 6 feet deep, 8 feet wide, and 10 feet long. The total length of the sand screw from the back end to the discharge end 33A is about 30 feet. The diameter of the screw or auger 31 is about 44 inches. The conduit 25 has an internal diameter of about 10 inches, and is spaced about 15 inches from the spreading plate 83. The plate 83 has a dimension of about 1 foot by 2 feet. Its lower edge is located about 1 inch above the water level and spaced about 1 inch inward from the weir 75. The discharge path 81 has a dimension of about 18 inches in width and 3 inches in depth. The plate 83 may be supported for example by way of supports illustrated at 85 and coupled to the plate and to the structure forming the tank 27. The inlet 29 has an internal inside diameter of about 2½ inches and water injected therein is injected at a rate of about 500 gallons a minute.

Referring to FIGS. 5 and 6, a description now will be had of the log washer 41 and improvements incorporated therein which has allowed it to effectively remove sticks, roots, pecans, cockleburs, etc. from material taken from reclaimed pits. Heretofore the aggregate and larger sized gravel was discharged into the log screw directly between the two logs 45 and 47 in the area illustrated by the dotted line 91. At the bottom of the container 43 in the same area as indicated by the dotted line 91 a perforated discharge pipe was employed for injecting water into the material to float out the sticks and roots and other debris through a discharge port illustrated at 93. In the gravel and aggregate obtained from reclaimed pits, however the material is laden with sticks and roots and other debris as indicated above. When the gravel and aggregate, ladened with debris, are discharged into the log scrubber directly between the two rotating logs 45 and 47, a large amount of the debris gets caught by the action of the logs or paddles with the gravel and aggregate and cannot separate out from the gravel and aggregate. The output from the log washer had far too much debris mixed therein and was unusable for commercial purposes.

In accordance with the present invention, the material fed into the scrubber 41 is fed to one side of both of the rotating logs 45 and 47 and into a strong stream of water illustrated at 95 and injected from the conduit 53. This stream of water in effect flushes or blows away the sticks and roots and other lighter weight debris and allows it to be discharged through the discharge port 93. The heavy weight gravel and aggregate however settles to the bottom and is caught up in the action of the paddles and moved to the center of the container where the paddles act on the aggregate and gravel to grind away the clay and other soil therefrom. In this arrangement thus the gravel and aggregate to be processed is fed into a high velocity stream of water to one side of the rotating action of the logs 45 and 47 to allow the water to separate the debris from the material prior to the movement of the material into the action of the blades. This arrangement resulted in a very affective removal of the sticks and roots and other debris from the gravel processed in the log washer 41.

In one embodiment, the log scrubber 41 has a depth of about 3 feet, a width of about 7 feet, and a length of about 30 feet. The conduit 53 had an inside diameter of about 2½ inches and water was injected therethrough at a rate of about 500 gallons per minute. The chute 51 has a width of about 15 inches and is located to discharge the material into the stream 95 about one foot from the end of the conduit 53. The logs 45 and 47 each has a diameter of about 3 feet. Each of the logs 45 and 47 comprises a cylindrical shaft 45A and 47A having secured thereto a plurality of rows of blades illustrated at 45B and 47B respectively. The blades are secured to the shafts at an angle whereby the blades upon rotation cause the material to grind against itself and against the blades and in addition to move forward from the lower end 43A to the upper end 43B to the discharge port 59. Although not illustrated, the blades of the two logs intermesh. The distance D between the outer edge of the log 47 and the container side illustrated at 49 is about 1 foot. The end of the conduit 53 is located about 12 feet from the back end 43C of the log washer.

I claim:
1. A sand screw comprising:
an elongated and inclined container portion extending from one end of an enlarged container portion and having a rotatable auger located in said enlarged portion and in said elongated portion for separating material in the form of sand and gravel from water,
inlet means located in said enlarged portion for injecting water into said enlarged portion from the bottom thereof, said enlarged container portion having a weir of a given length extending across the top of an end opposite said one end and spaced laterally away from the end of said auger in said enlarged portion, a first conduit means having an end located above said enlarged portion and above said auger generally at the center of said enlarged portion for injecting fine grained material into said enlarged portion, an opening formed in the top of said weir and having a width much less than the length of said weir for forming a restricted flow path spaced away from the action of the auger for directing the flow of water and debris from said enlarged container portion through said restricted flow path, a generally vertical plate means located above and adjacent said opening at a position inward from said opening, said plate means having a side facing said elongated and inclined container portion, and a second conduit means for discharging coarser grained material onto said side of said plate means to allow lighter weight debris mixed with said coarser grained material to separate therefrom before the coarser grained material moves into the action of the auger.

* * * * *